United States Patent [19]
Choi et al.

[11] Patent Number: 5,673,087
[45] Date of Patent: Sep. 30, 1997

[54] SCREEN OVERLAY DEVICE FOR OUTPUTTING CURSOR COORDINATES BASED ON MOVEMENT OF A POINTING DEVICE AND AN ON-SCREEN DISPLAY RELATING TO A MENU AND A METHOD THEREFOR

[75] Inventors: Eun-suk Choi, Seoul; Sang-gyun Kim, Suwon, both of Rep. of Korea

[73] Assignee: Samsung Electronics Co., Ltd., Kyungki-do, Rep. of Korea

[21] Appl. No.: 478,518

[22] Filed: Jun. 7, 1995

[30] Foreign Application Priority Data

Nov. 25, 1994 [KR] Rep. of Korea .............. 94-31227

[51] Int. Cl.$^6$ .............................................. H04N 5/445
[52] U.S. Cl. .................... 348/511; 348/569; 348/601; 345/157
[58] Field of Search .................... 348/600, 601, 348/584, 589, 590, 593, 596, 569, 570, 511, 734; 345/157, 158, 159, 160, 161, 162, 163, 164, 165, 166, 167; H04N 5/445, 5/00, 5/45

[56] References Cited

U.S. PATENT DOCUMENTS

| 5,051,817 | 9/1991 | Takano | 348/600 |
|---|---|---|---|
| 5,452,012 | 9/1995 | Saitoh | 348/569 |
| 5,532,753 | 7/1996 | Buchner et al. | 348/569 |

FOREIGN PATENT DOCUMENTS

| 0120783 | 6/1987 | Japan | H04N 5/00 |
|---|---|---|---|
| 0294687 | 12/1990 | Japan | 345/157 |
| 0205237 | 7/1994 | Japan | H04N 5/00 |

*Primary Examiner*—David E. Harvey
*Attorney, Agent, or Firm*—Sughrue, Mion, Zinn, Macpeak & Seas

[57] ABSTRACT

A screen overlay device and method, and a television using the same are provided. The screen overlay device overlays a menu and cursor on a screen, and includes a pointing device wireless transmitter for transmitting an infrared (IR) signal corresponding to a key-input and the movement of a pointing device; an IR signal receiver/amplifier; a controller for calculating cursor coordinates corresponding to the movement of the pointing device in response to the amplified signal and outputting on-screen display (OSD) data related to the menu; an overlay unit for receiving the OSD data and cursor coordinates and generating a corresponding RGB signal in synchronization with horizontal and vertical sync signals; and an RGB synthesizer for synthesizing the RGB signal generated by the overlay using an external RGB signal in synchronization with the horizontal and vertical sync signals. The pointing device wireless transmitter includes a keypad; a trackball for converting movement of a ball into electric signals and outputting the result; a controller, connected to the keypad and trackball, which receives the electrical signal, converts the signal into predetermined data and outputs the result; and an IR transmitter, connected to the controller, which receives the predetermined data, converts the data into an IR signal and transmits the result. The screen displays all the operational controls of the system by employing an OSD function, without increasing the number of remote controller keys, so that users can select a displayed function in order to simplify control.

11 Claims, 8 Drawing Sheets

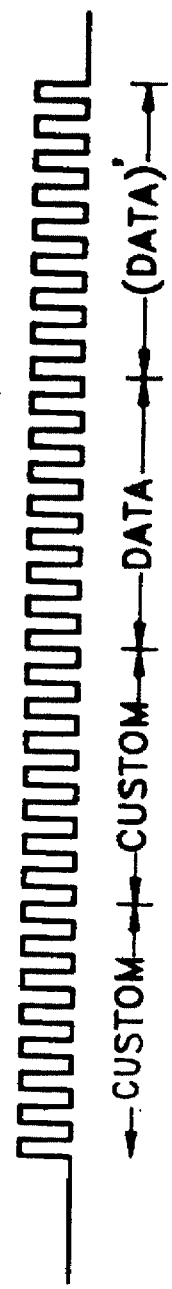
FIG. 3A
FIG. 3B
FIG. 3C
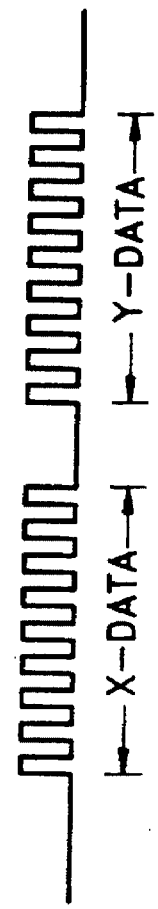
FIG. 5A
FIG. 5B
FIG. 5C

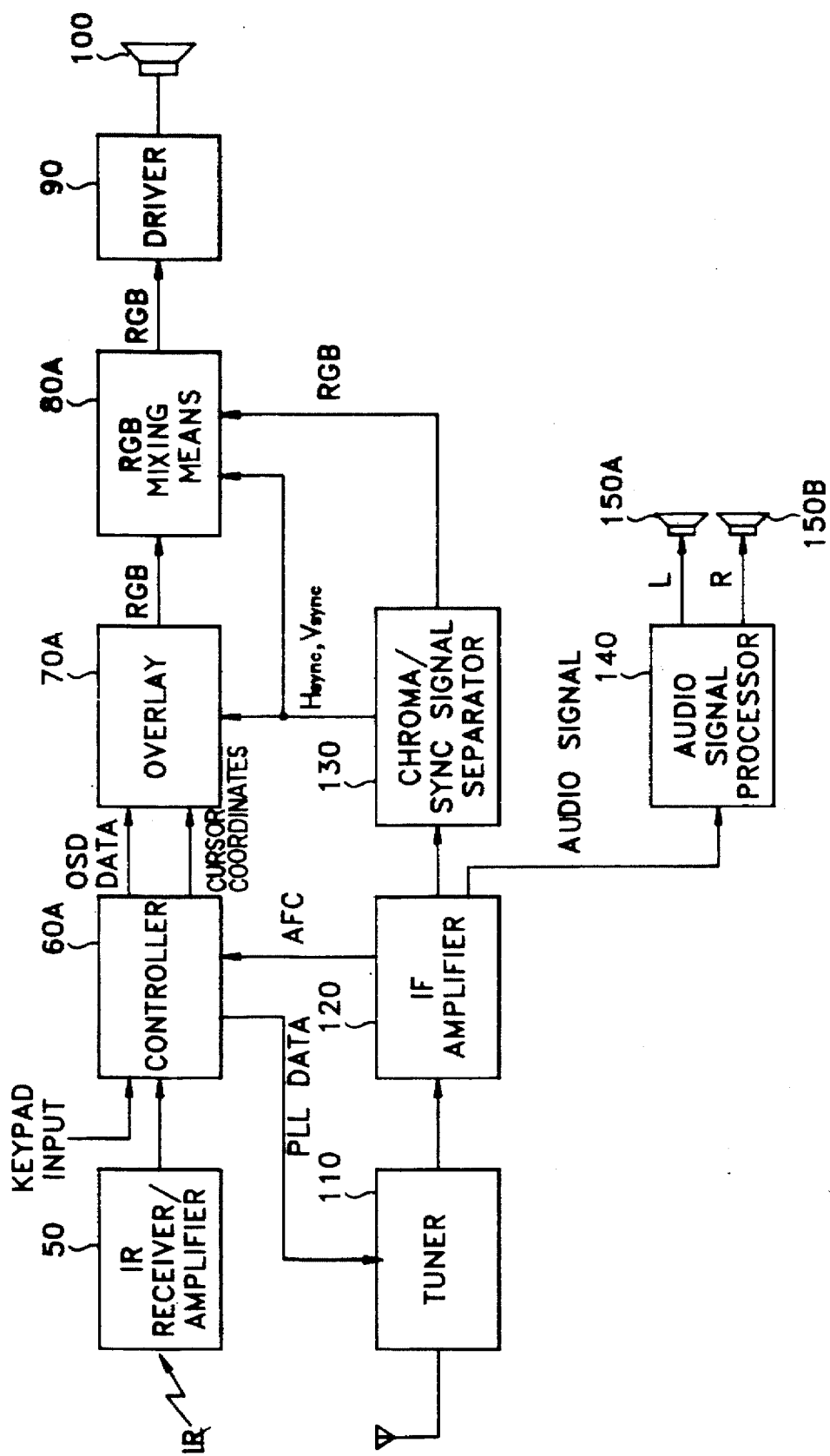

SCREEN OVERLAY DEVICE FOR OUTPUTTING CURSOR COORDINATES BASED ON MOVEMENT OF A POINTING DEVICE AND AN ON-SCREEN DISPLAY RELATING TO A MENU AND A METHOD THEREFOR

BACKGROUND OF THE INVENTION

The present invention relates to a screen overlay device and the method thereof, and more particularly, to a screen overlay device for overlaying a cursor and selection menu on a screen, so that the menu item displayed onto the screen can be selected by a pointing device, such as a trackball or a mouse, and a method and television using the same.

Devices which employ a screen display, e.g., a television, videocassette recorder or compact disk player, tend to be of a relatively high quality and have multiple functions such that controlling their operation becomes quite complicated. Often in such systems, a character or icon indicating a particular function is displayed on the screen. Then, the function is selected by use of a button on a remote controller, thereby controlling the operation of the device. However, since the number of buttons on the remote controller is limited and the buttons are frequently used merely as up/down and right/left key inputs, their use can be inconvenient.

SUMMARY OF THE INVENTION

Accordingly, it is an object of the present invention to provide a screen overlay device for overlaying a selection menu and cursor on a screen display in response to an infrared (IR) signal corresponding to a key input and movement of a pointing device.

It is another object of the present invention to provide a control method of a screen overlay device for overlaying a selection menu and cursor on a screen display in response to an infrared (IR) signal corresponding to a key input and movement of a pointing device.

It is still another object of the present invention to provide a television employing a screen overlay device.

To accomplish the first of the above objects of the present invention, there is provided a screen overlay device for overlaying a menu and cursor on a screen comprising: a pointing device wireless transmitter for transmitting an infrared (IR) signal corresponding to one of a key-input and movement of a pointing device; an IR signal receiving and amplifying unit for receiving said IR signal and amplifying the signal by a predetermined gain; a controller for calculating, in response to said amplified signal, cursor coordinates corresponding to movement of said pointing device and outputting said cursor coordinates and on-screen display (OSD) data related to the menu; an overlay unit for receiving said cursor coordinates and OSD data and generating a corresponding red-green-blue (RGB) signal in synchronization with horizontal and vertical sync signals; and an RGB mixer for mixing said RGB signal generated by said overlay unit with an external RGB signal synchronized with said horizontal and vertical sync signals.

The pointing device wireless transmitter comprises: a keypad having a plurality of keys; a pointing unit for converting movement of said pointing device to an electrical signal and outputting the result; a controller connected to said keypad and said pointing unit and which receives said electrical signal, converts the signal into predetermined data and outputs the result; and an IR transmitter, connected to said controller, which receives said predetermined data, converts the data into an IR signal and transmits the result.

To accomplish the second of the above objects of the present invention, there is provided a method for controlling a screen overlay device in response to an infrared (IR) signal corresponding to a key-input and movement of a pointing device and overlaying a cursor and menu on a screen, said method comprising the steps of: (a) determining whether said IR signal corresponds to movement of said pointing device; (b) determining whether the screen is in a menu mode, if said IR signal corresponds to the movement of said pointing device in step (a); (c) determining whether said IR signal is an X-axis signal or a Y-axis signal, if in step (b) the screen is determined to be in a menu mode; (d) performing an X-axis signal inspection and coordinate calculation, if in step (c) said IR signal is determined to be an X-axis signal; and (e) performing a Y-axis signal inspection and coordinate calculation, if in step (c) said IR signal is determined to be a Y-axis signal.

To accomplish the third of the above objects of the present invention, there is provided a television employing a screen overlay device for overlaying a cursor and menu on a screen, said television comprising: a pointing device wireless transmitter for transmitting an infrared (IR) signal corresponding to a key-input and movement of a pointing device; an IR signal receiving and amplifying unit for receiving said IR signal and amplifying the signal by a predetermined gain; a controller for generating a red-green-blue (RGB) signal corresponding to on-screen display (OSD) data related to said menu in response to said amplified signal, outputting a phase-locked loop (PLL) data signal corresponding to a channel selection signal and calculating cursor coordinates corresponding to movement of said pointing device; a tuner for selecting a television broadcast signal in response to said PLL data signal; an intermediate frequency amplifier for receiving said selected signal, removing a carrier frequency, separating an video signal and an audio signal from said selected signal and outputting an automatic frequency control signal to said controller; a chroma/sync signal separator unit for receiving said video signal and separating an RGB signal, a horizontal and a vertical sync signal from said video signal; an overlay unit for generating OSD data related to said menu and an RGB signal corresponding to said cursor coordinates in synchronization with the horizontal and vertical sync signals; and an RGB mixer for mixing the RGB signal generated by said overlay unit with the RGB signal separated by said chroma/sync signal separator in synchronization with said horizontal and vertical sync signals.

BRIEF DESCRIPTION OF THE DRAWINGS

The above objects and other advantages of the present invention will become more apparent by describing in detail preferred embodiments thereof with reference to the attached drawings in which:

FIGS. 3A–3C are waveforms of an IR signal of the pointing device wireless transmitter of FIG. 1;

FIGS. 5A–5C illustrate the data format transmitted from the controller to the overlay of FIG. 4;

FIG. 11 illustrates an embodiment of the screen overlay device of FIG. 4.

DETAILED DESCRIPTION OF THE INVENTION

Figure 1:
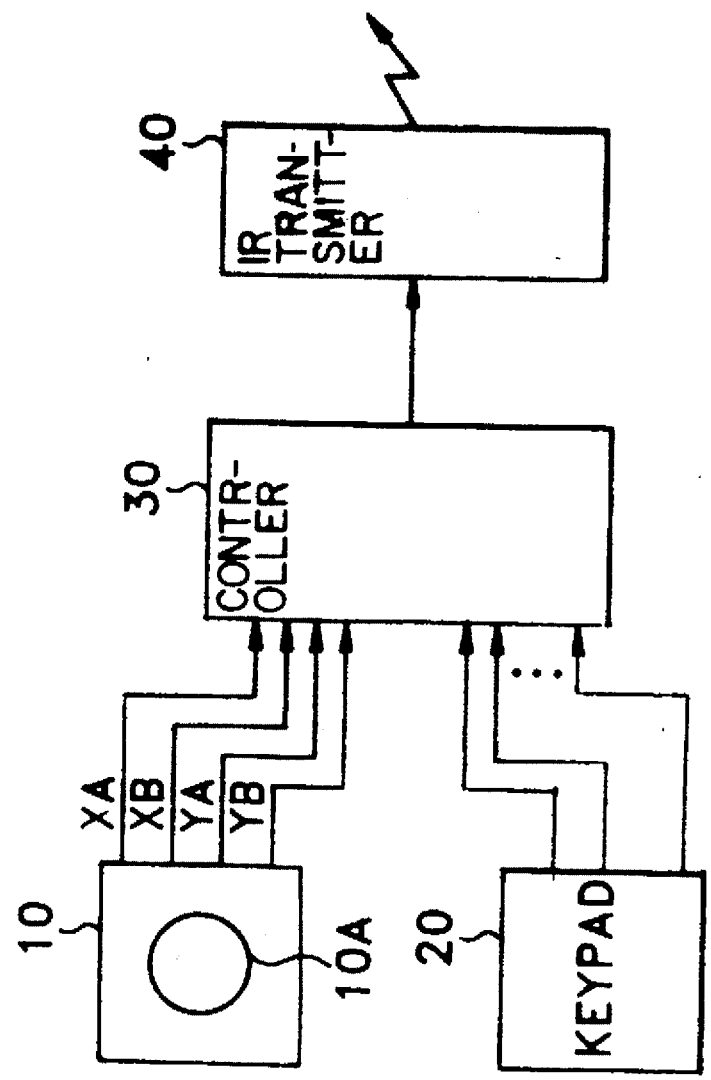
FIG. 1 is a block diagram showing a pointing device wireless transmitter of the present invention.

FIG. 1 is a block diagram showing a wireless transmitter of a pointing device, such as a pointing device or computer mouse of the present invention. In the present embodiment, the pointing device wireless transmitter consists of a trackball 10, a keypad 20, a controller 30, and an IR transmitter 40.

Figure 2:
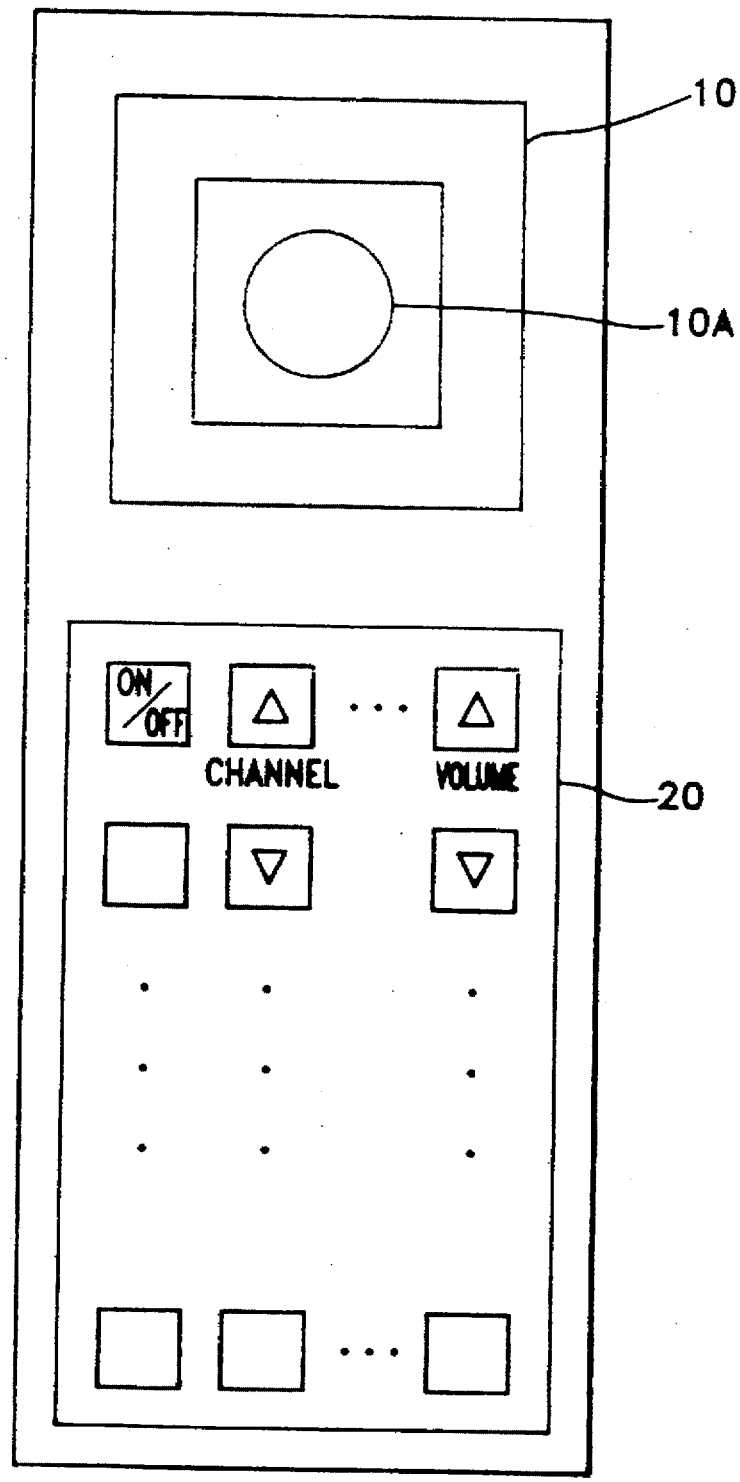
FIG. 2 illustrates a pointing device and key array of a keypad.

FIG. 2 illustrates an embodiment showing the pointing device 10 and the key of keypad 20 of the pointing device wireless transmitter, wherein the trackball 10 and keypad 20 are formed into a single device.

FIG. 3A to FIG. 3C are waveforms of an IR signal output from the pointing device wireless transmitter. FIG. 3A illustrates a strobe signal output by a transmitter microcomputer (not shown) of the receiver side. Here, when the strobe signal is at the logic "high" state, the transmitted data is valid. FIG. 3B illustrates a clock signal, and FIG. 3C illustrates the data format of an IR signal transmitted from the pointing device wireless transmitter.

Variance from the current position of the pointing device is calculated, based on an X and Y axes coordinate system, by controller 30 according to signals XA, XB, YA and YB, i.e., electrical signals representing the movement of a ball 10A of trackball 10. The result is converted into an IR signal via IR transmitter 40 and then output. As shown in FIG. 3A to FIG. 3C, data with respect to the X- and Y-axes, is output when the strobe signal generated by a receiver side microcomputer (not shown) is in the logic "high" state. Accordingly, X-axis data is output first and then Y-axis data is output, or vice versa. As shown in FIG. 3C, the transmitted data has two CUSTOM data blocks and two axis data blocks (i.e., X-axis data and Y-axis data). Here, in general, the first block of the CUSTOM data is "07" for a television, and "05" for a videocassette recorder, and a second CUSTOM data block indicates whether the data blocks contain either X-axis data or Y-axis data. Among the two axis data blocks (i.e., the X-axis and Y-axis variance values), the second axis data block (DATA)' represents data that is inverted from the first axis data block (DATA) and is used for detecting an error by comparing, in a receiver, the two axis data blocks. At this time, the number of total bits is 32, with eight bits allocated for the data of each axis.

Figure 4:
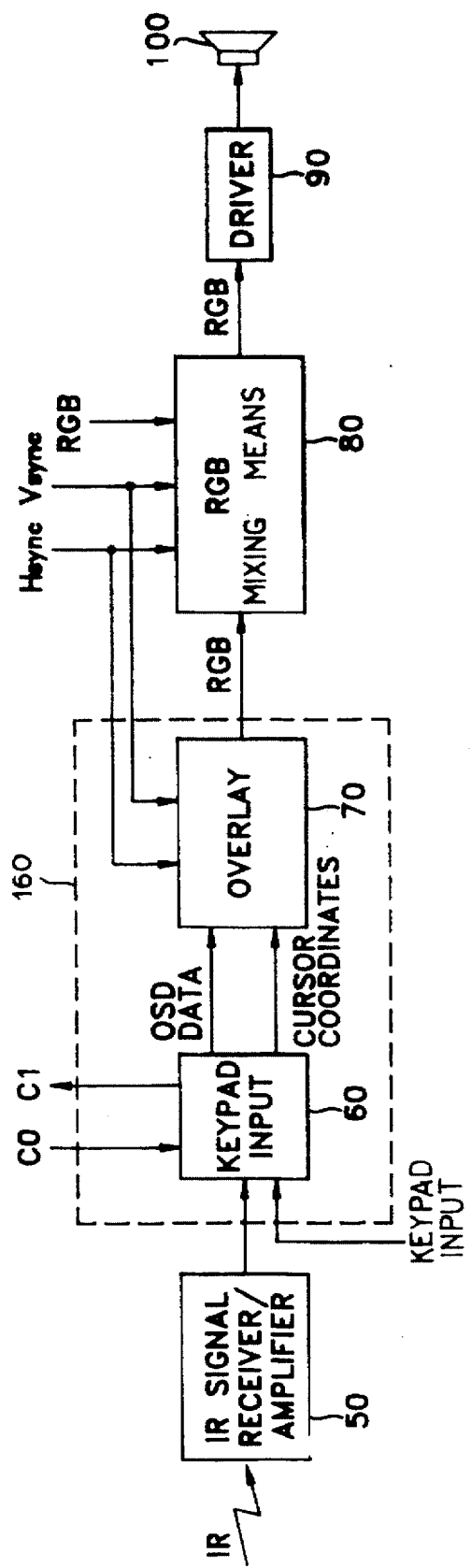
FIG. 4 is a block diagram illustrating a screen overpay of the present invention.

FIG. 4 illustrates an embodiment of the present invention showing a screen cursor overlaying device that receives a signal from the pointing device wireless transmitter shown in FIG. 1 and controls operation of the system via a screen display.

The device shown in FIG. 4 includes an IR signal receiver/amplifier 50 for receiving an IR signal from the pointing device wireless transmitter of FIG. 1 and amplifying the received signal by a predetermined gain. Further, it consists of a controller 60 comprising, for example, a microcomputer, which receives the amplified IR signal so as to calculate and output a cursor coordinate value and output on-screen-display (OSD) data for displaying a menu having an operation selection item. The device of FIG. 4 also includes an overlay unit 70 for receiving the cursor coordinate value and OSD data input from controller 60, and generating a red-green-blue (RGB) signal. An RGB mixer 80 mixes the RGB signal from overlay unit 70 with an external RGB signal. A driver 90 receives the RGB signal output from RGB mixer 80 so as to drive a screen display 100.

FIGS. 5A to 5C illustrate the data format of a cursor coordinate value output from controller 60 to overlay unit 70, as shown in FIG. 4. FIG. 5A illustrates a strobe signal output from controller 60, FIG. 5B illustrates a clock signal, and FIG. 5C illustrates X- and Y-axis data.

IR signal receiver/amplifier 50 receives and amplifies the two CUSTOM data blocks and the two axis data blocks shown in FIG. 3C, and delivers the amplified signal to controller 60. Controller 60 calculates a cursor coordinate value and delivers to overlay unit 70, X- and Y-axis data as shown in FIG. 5C. At this time, the X-axis and Y-axis data each consist of, for example, nine bits.

Figure 6:
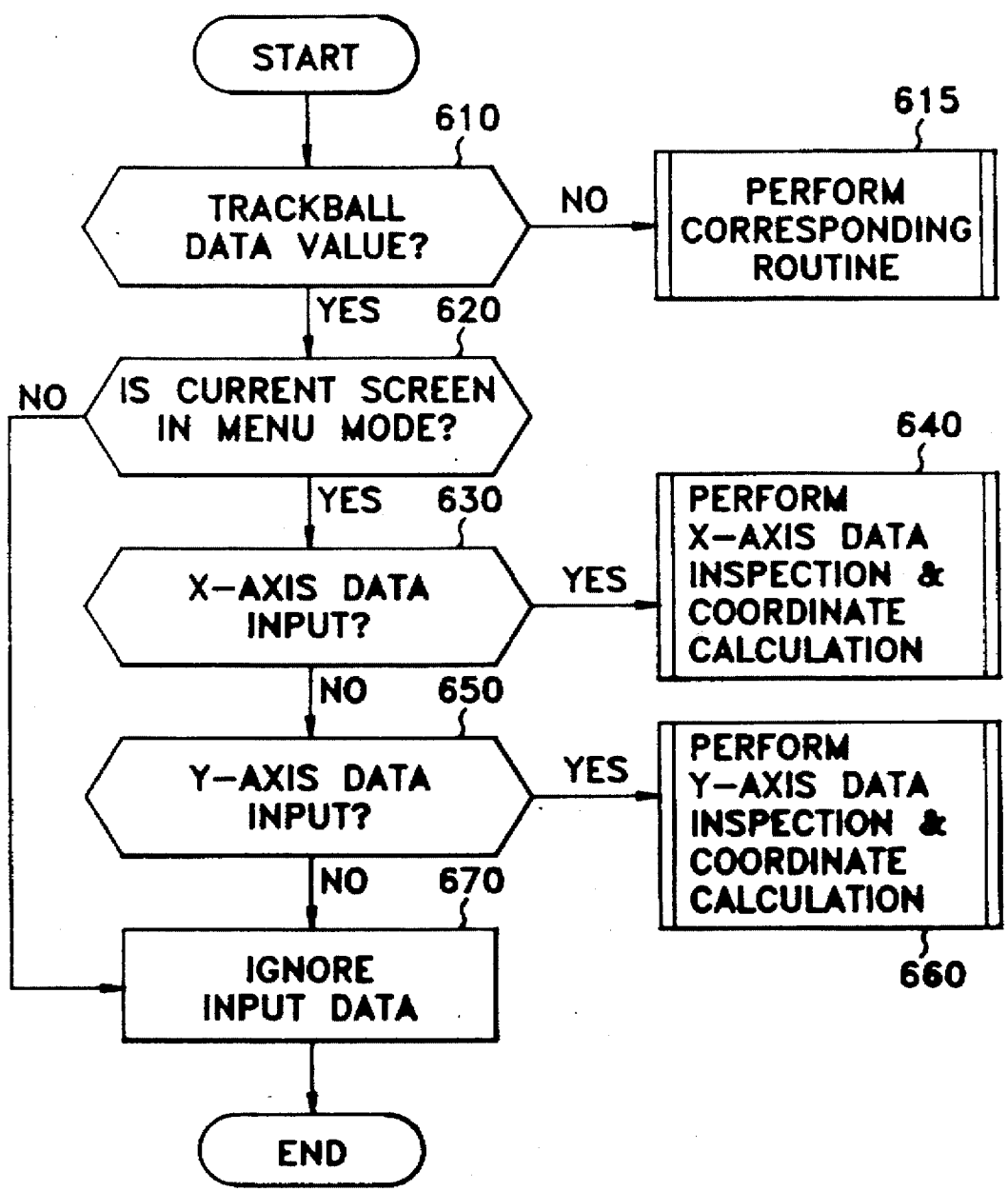
FIG. 6 is a flowchart illustrating a control operation depending on the IR signal of the controller of FIG. 4.

FIG. 6 is a flowchart illustrating operation of controller 60 based on input from the keypad and movement of the ball within the trackball of the pointing device wireless transmitter.

Figure 7:
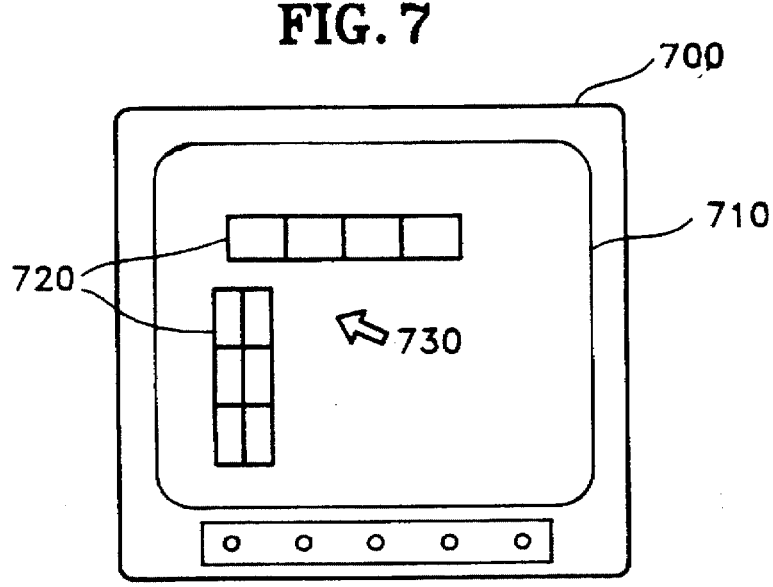
FIG. 7 illustrates a screen in a menu mode of the screen display of FIG. 4.

First, controller 60 receives data from IR receiver/amplifier 50, or from an external keypad (not shown), and determines whether the received data is a trackball data value (step 610). Here, if the data is not a trackball data value (for example, if the data relates to a channel key or volume key for a television), a corresponding routine is performed (step 615). If the data is trackball data, it is determined if the system is in a menu mode where a selection menu 720 and cursor 730 are displayed on the screen 710 of screen display 700, as shown in FIG. 7, so that an operation (e.g., a function) can be selected (step 620). If the system is in a menu mode, it is determined whether X-axis data input or Y-axis data input is present (steps 630 and 650). In other words, if the CUSTOM data value of FIG. 3C has a predetermined data value, it is determined whether X-axis data is input. If X-axis data is input that data is inspected, or checked for errors, and the X-axis coordinate value is calculated (step 640). Meanwhile, if it is determined that Y-axis data is input in step 650, the Y-axis data is inspected, or checked for errors, and the Y-axis coordinate value is calculated (step 660). If neither X-axis nor Y-axis data is input and the current screen is not in a menu mode as determined in step 620, the input data is ignored (step 670).

Figure 8:
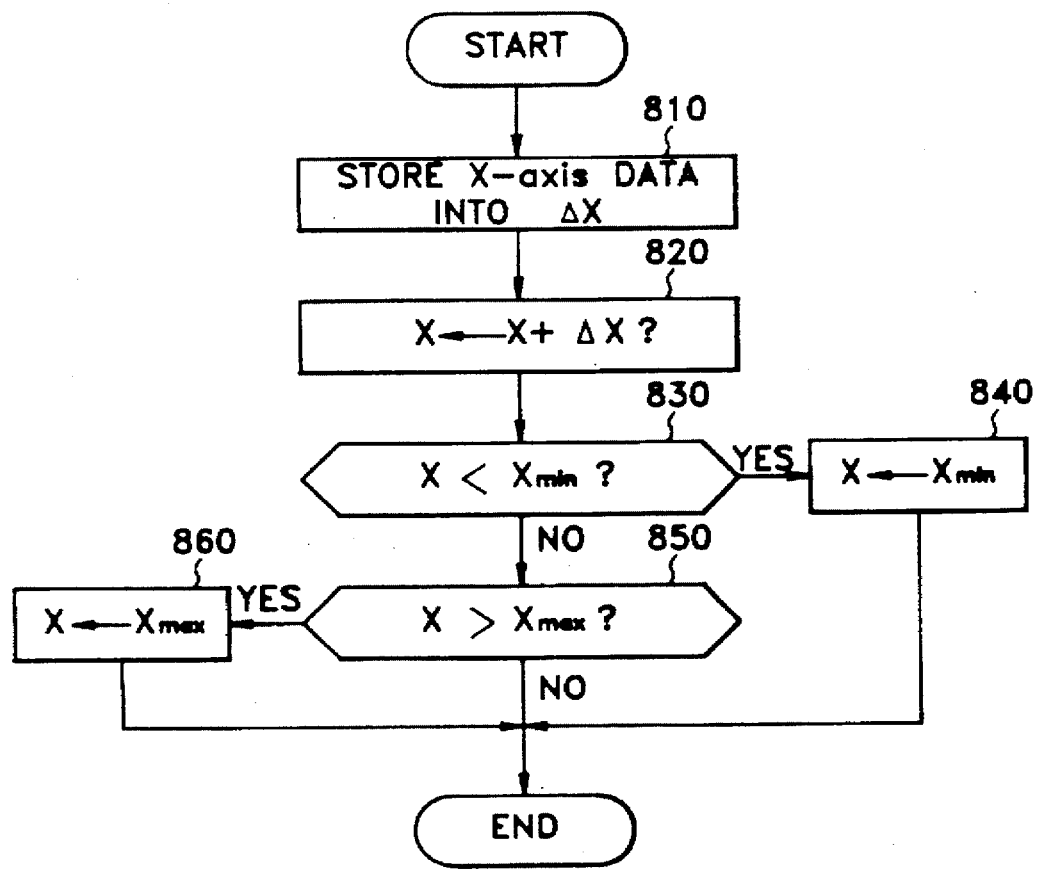
FIG. 8 is a flowchart illustrating the X-axis data inspection and coordinate calculating routine of FIG. 6.

Step 640 is explained in more detail with reference to FIG. 8. First, the input X-axis data is stored in displacement variable ΔX (step 810). Then, the displacement variable ΔX is added to the current X-axis coordinate value (step 820). Then, it is determined whether the sum is smaller than an X-axis minimum value $X_{min}$ (step 830). If the sum is smaller than the X-axis minimum value, the current X-axis data value is set to the minimum X-axis data value (step 840). If the value is not smaller than the X-axis minimum value, it is determined whether the sum is larger than the X-axis maximum value $X_{max}$ (step 850). If the sum is larger than the X-axis maximum data value of step 850, then the current X-axis data value is set to the X-axis maximum data value (step 860).

Figure 9:
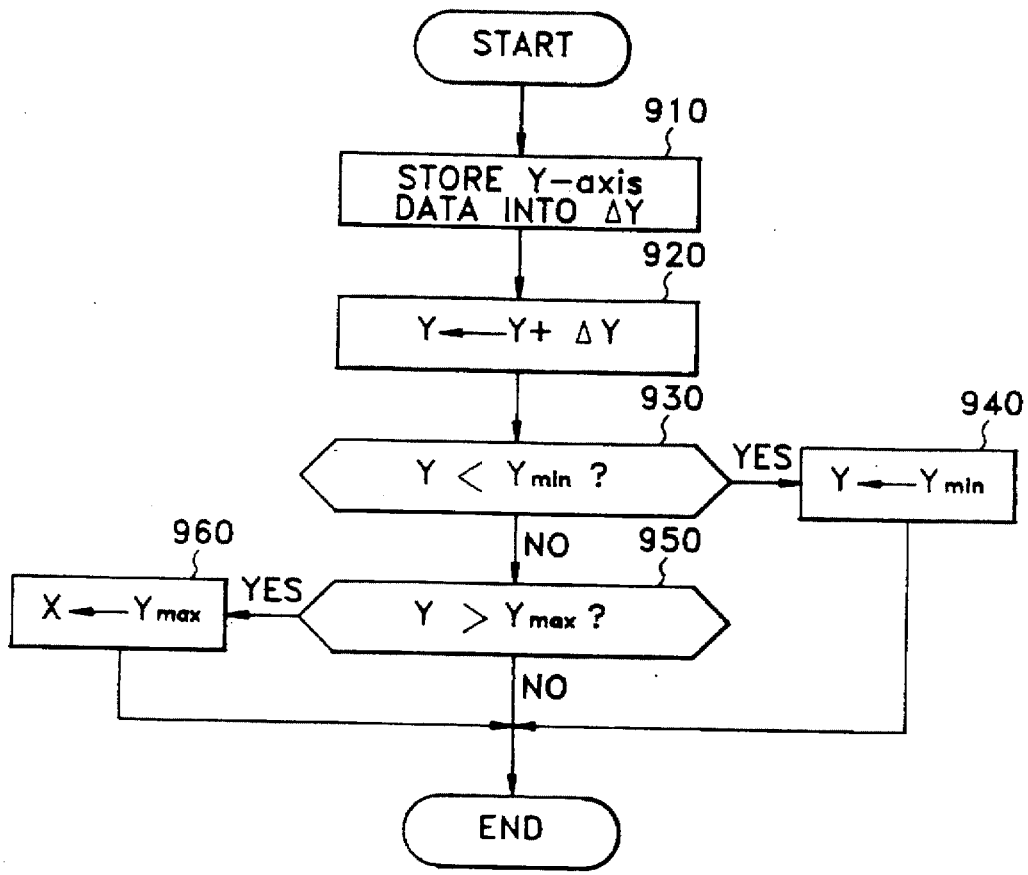
FIG. 9 is a flowchart illustrating the Y-axis data inspection and coordinate calculating routine of FIG. 6.

Step 660 is explained in more detail with reference to FIG. 9. First, the input Y-axis data is stored in displacement variable ΔY (step 910). Then, the displacement variable ΔY is added to the current Y-axis coordinate value (step 920). Next, it is determined whether the sum from step 920 is smaller than a Y-axis minimum value $Y_{min}$ (step 930). If the sum is smaller than the Y-axis minimum value, the current Y-axis data value is set to the minimum Y-axis data value (step 940). If the value is not smaller than the Y-axis minimum value, it is determined whether the sum is larger than the Y-axis maximum value $Y_{max}$ (step 950). If the sum is larger than the Y-axis maximum data value from step 950, the current Y-axis data value is set to the Y-axis maximum data value (step 960).

If no Y-axis data is input in step 650 and the system is not in a menu mode at step 620, then the input data is ignored (step 670).

When the X-Y coordinate calculation is completed, as described above, controller 60 delivers to overlay unit 70 the current X and Y-axis coordinate values and OSD data with respect to the menu. Then, the OSD data with respect to the menu and the current X and Y-axis coordinate values are converted into an RGB signal by overlay unit 70. Next, as shown in FIG. 7, selection menu 720 and cursor 730 are displayed on screen display 710 by being overlaid onto the current screen.

Figure 10:
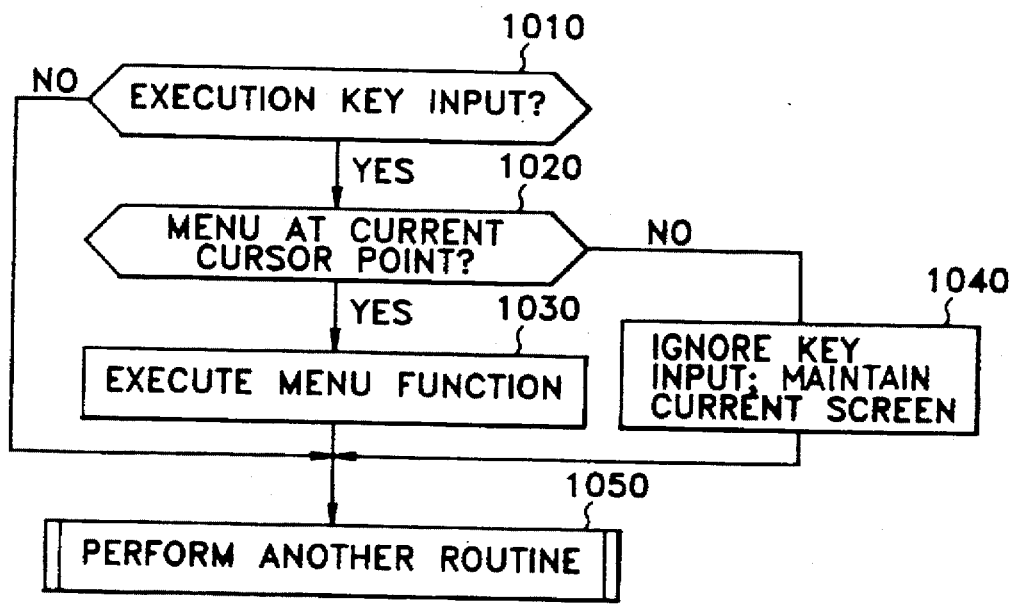
FIG. 10 is a flowchart illustrating a control operation in a menu mode of the controller of FIG. 4.

FIG. 10 is a flowchart for illustrating operation of controller 60 in a menu mode, as shown in FIG. 7.

Referring to FIG. 10, it is determined whether input from an execution key is received while in the menu mode (step 1010). In other words, it is determined whether an execution key on the keypad of the pointing device wireless transmitter of the present invention, or an execution key of a keypad elsewhere in the system is depressed. If an execution key is depressed in step 1010, it is determined whether a menu exists in the same position as that in which the current cursor is located (step 1020). If, in step 1020, the cursor and menu are at the same position, the corresponding menu selection at that position is executed. In other words, if a sub-menu is requested, the sub-menu is displayed or a control operation (function) of the corresponding menu is performed (step 1030). If the cursor and menu are not at the same position in step 1020, the key input is ignored and the current screen is maintained (step 1040). Further, if input from an execution key is not received in step 1010, another routine is performed (step 1050).

Controller 60 also receives the vertical and horizontal sync signals externally input to overlay unit 70, generates an RGB signal with respect to the menu and delivers the signal to overlay unit 70. Here, controller 60 and overlay unit 70 are formed into a single body as an integrated circuit. In addition, controller 60 receives data from an external keypad and performs a process thereon. For example, when the present invention is applied to a television, controller 60 may receive a channel or volume control signal as an operational control signal, to thereby perform the corresponding operation. In addition, an external control signal is input or output via control terminals C0 and C1, to thereby control an external component. Accordingly, the input and output of the control terminal can be changed depending on the application of the present invention.

FIG. 11 is a block diagram showing another embodiment of the present invention. Here, like components to those of FIG. 4 have the same reference numeral used and therefore, an explanation thereof will be omitted.

First, a controller 60A outputs PLL data to a tuner 110 in order to select a desired channel. Here, tuner 110 delivers the selected signal from a signal source such as an antenna, to intermediate frequency (IF) amplifier 120 which outputs an automatic frequency control (AFC) signal to controller 60. IF amplifier 120 receives the selected signal, removes a carrier frequency, separates a video signal and an audio signal from the selected signal and outputs the result to chroma/sync signal separator 130 and audio signal processor 140, respectively. Then, chroma/sync signal separator 130 delivers vertical and horizontal sync signals (Vsync and Hsync) to an overlay unit 70A. In addition, the audio signal is separated by audio signal processor 140, for output to left (L) and right (R) speakers 150A and 150B. Then, the audio signal is amplified by a predetermined gain in response to an audio control signal and tone control is performed in response to a tone-control signal. Overlay unit 70A receives cursor coordinates and OSD data from controller 60A, and vertical and horizontal sync signals from chroma/sync signal separator 130. Overlay unit 70A synchronizes the received signals so as to generate an RGB signal. Then, RGB mixer 80A is synchronized with the sync signals input from chroma/sync signal separator 130. Further, RGB mixer 80A receives two RGB signals from overlay unit 70A and chroma/sync signal separator 130, respectively, and mixes the received RGB signals. Accordingly, the menu and cursor are overlaid onto a television screen and output onto screen display 100 driven by driver 90.

As described above, the present invention alleviates the inconvenience of repeatedly performing up/down and left/right key operations in order to control a menu displayed on a screen in devices which include a screen display. That is, a one-time manual operation enables operational control via a pointing device wireless transmitter, e.g., a trackball remote controller. In addition, instead of increasing the number of remote controller keys by adding various functions, the screen displays all such functions by employing an OSD function. Then, a user simply selects the displayed function, thereby simplifying operational control of the device.

While the present invention has been described above according to preferred embodiments, persons skilled in the art readily understand that other means can be employed to achieve the objects according to the basic teachings set forth herein.

What is claimed:

1. A screen overlay device for overlaying a menu and cursor on a screen comprising:

a pointing device wireless transmitter for transmitting an infrared (IR) signal corresponding to one of a key-input and movement of a pointing device;

an IR signal receiving and amplifying unit for receiving said IR signal and amplifying the signal by a predetermined gain;

a controller for calculating, in response to said amplified signal, cursor coordinates corresponding to movement of said pointing device and outputting said cursor coordinates and on-screen display (OSD) data related to the menu, wherein said controller calculates the cursor coordinates by adding a first displacement value based on the movement of the pointing device to a current first-axis coordinate value thereby generating a first sum and setting said first-axis coordinate value to a minimum first coordinate value if the first sum is less than the minimum first coordinate value and setting said first-axis coordinate value to a maximum first coordinate value if the first sum is greater than the maximum first coordinate value, and adding a second displacement value based on the movement of the pointing device to a current second-axis coordinate value thereby generating a second sum and setting said second-axis coordinate value to a minimum second coordinate value if the second sum is less than the minimum second coordinate value and setting said second-axis coordinate value to a minimum second coordinate value if the second sum is greater than the maximum second coordinate value;

an overlay unit for receiving said cursor coordinates and OSD data and generating a corresponding red-green-blue (RGB) signal in synchronization with horizontal and vertical sync signals; and an RGB mixer for mixing said RGB signal generated by said overlay unit with an external RGB signal synchronized with said horizontal and vertical sync signals.

2. A screen overlay device according to claim 1, wherein said pointing device wireless transmitter comprises:

a keypad having a plurality of keys;

a pointing unit for converting movement of said pointing device to an electrical signal and outputting the result;

a pointing device controller connected to said keypad and said pointing unit and which receives said electrical signal, converts the signal into predetermined data and outputs the result; and an IR transmitter, connected to said pointing device controller, which receives said predetermined data, converts the data into an IR signal and transmits the result.

3. A screen overlay device according to claim 2, wherein said pointing device is a trackball.

4. A screen overlay device according to claim 2, wherein said pointing device is a computer mouse.

5. A screen overlay device according to claim 2, wherein said pointing device controller is a microcomputer.

6. A screen overlay device for overlaying a menu and cursor on a screen comprising:

a pointing device wireless transmitter for transmitting infrared (IR) signal corresponding to one of a key-input and movement of a pointing device;

an IR signal receiving and amplifying unit for receiving said IR signal and amplifying the signal by a predetermined gain;

a controller for generating a red-green-blue (RGB) signal corresponding to on-screen display (OSD) data related to said menu in response to said amplified signal, and calculating cursor coordinates corresponding to movement of said pointing device by adding a first displacement value based on the movement of the pointing device to a current first-axis coordinate value thereby generating a first sum and setting said first-axis coordinate value to a minimum first coordinate value if the first sum is less than the minimum first coordinate value and setting said first-axis coordinate value to a maximum first coordinate value if the first sum is greater than the maximum first coordinate value, and adding a second displacement value based on the movement of the pointing device to a current second-axis coordinate value thereby generating a second sum and setting said second-axis coordinate value to a minimum second coordinate value if the second sum is less than the minimum second coordinate value and setting said second-axis coordinate value to a minimum second coordinate value if the second sum is greater than the maximum second coordinate value;

an overlay unit for generating an RGB signal corresponding to said cursor coordinates in synchronization with horizontal and vertical sync signals, mixing the generated RGB signal with the RGB signal generated by said controller, and outputting the result; and an RGB mixer for mixing the RGB signal generated by said overlay unit with an external RGB signal in synchronization with said horizontal and vertical sync signals.

7. A method for controlling a screen overlay device in response to an infrared (IR) signal corresponding to a key-input and movement of a pointing device and overlaying a cursor and menu on a screen, said method comprising the steps of:

(a) determining whether said IR signal corresponds to movement of said pointing device;

(b) determining whether the screen is in a menu mode, if said IR signal corresponds to the movement of said pointing device in step (a);

(c) determining whether said IR signal is an X-axis signal or a Y-axis signal, only if in step (b) the screen is determined to be in a menu mode;

(d) performing an X-axis signal inspection and coordinate calculation, only if in step (c) said IR signal is determined to be an X-axis signal; and (e) performing a Y-axis signal inspection and coordinate calculation, only if in step (c) said IR signal is determined to be a Y-axis signal, wherein said step (d) comprises the steps of:

storing said X-axis signal as a displacement variable $\Delta X$;

adding said displacement variable $\Delta X$ to a current X-axis coordinate value;

setting the current X-axis coordinate value to an X-axis minimum coordinate value $X_{min}$, if the result of said adding step is smaller than the X-axis minimum coordinate value $X_{min}$; and setting an X-axis maximum coordinate value $X_{max}$ to the current X-axis coordinate value, if the result of said adding step is larger than the X-axis maximum coordinate value $X_{max}$.

8. A method for controlling a screen overlay device in response to an infrared (IR) signal corresponding to a key-input and movement of a pointing device and overlaying a cursor and menu on a screen, said method comprising the steps of:

(a) determining whether said IR signal corresponds to movement of said pointing device;

(b) determining whether the screen is in a menu mode, if said IR signal corresponds to the movement of said pointing device in step (a);

(c) determining whether said IR signal is an X-axis signal or a Y-axis signal, only if in step (b) the screen is determined to be in a menu mode;

(d) performing an X-axis signal inspection and coordinate calculation, only if in step (c) said IR signal is determined to be an X-axis signal; and (e) performing a Y-axis signal inspection and coordinate calculation, only if in step (c) said IR signal is determined to be a Y-axis signal, wherein said step (e) comprises the steps of:

storing said Y-axis signal as a displacement variable $\Delta Y$;

adding said displacement variable $\Delta Y$ to the current Y-axis coordinate value;

setting the current Y-axis coordinate value to a Y-axis minimum coordinate value $Y_{min}$, if the result of said adding step is smaller than the Y-axis minimum coordinate value $Y_{min}$; and setting the current Y-axis coordinate value to a Y-axis maximum coordinate value $Y_{max}$, if the result of said adding step is larger than the Y-axis maximum coordinate value $Y_{max}$.

9. A television employing a screen overlay device for overlaying a cursor and menu on a screen, said television comprising:

a pointing device wireless transmitter for transmitting an infrared (IR) signal corresponding to a key-input and movement of a pointing device;

an IR signal receiving and amplifying unit for receiving said IR signal and amplifying the signal by a predetermined gain;

a controller for generating a red-green-blue (RGB) signal corresponding to on-screen display (OSD) data related to said menu in response to said amplified signal, outputting a phase-locked loop (PLL) data signal corresponding to a channel selection signal and calculating cursor coordinates corresponding to movement of said pointing device by adding a first displacement value based on the movement of the pointing device to a current first-axis coordinate value thereby generating a first sum and setting said first-axis coordinate value to a minimum first coordinate value if the first sum is less than the minimum first coordinate value and setting said first-axis coordinate value to a maximum first coordinate value if the first sum is greater than the maximum first coordinate value, and adding a second displacement value based on the movement of the pointing device to a current second-axis coordinate value thereby generating a second sum and setting said second-axis coordinate value to a minimum second coordinate value if the second sum is less than the minimum second coordinate value and setting said second-axis coordinate value to a minimum second coordinate value if the second sum is greater than the maximum second coordinate value;

a tuner for selecting a television broadcast signal in response to said PLL data signal;

an intermediate frequency amplifier for receiving said selected signal, removing a carrier frequency, separating an video signal and an audio signal from said selected signal and outputting an automatic frequency control signal to said controller;

a chroma/sync signal separator unit for receiving said video signal and separating an RGB signal, a horizontal and a vertical sync signal from said video signal;

an overlay unit for generating OSD data related to said menu and an RGB signal corresponding to said cursor coordinates in synchronization with the horizontal and vertical sync signals; and an RGB mixer for mixing the RGB signal generated by said overlay unit with the RGB signal separated by said chroma/sync signal separator in synchronization with said horizontal and vertical sync signals.

10. A screen overlay device according to claim 9, wherein said pointing device is a trackball.

11. A screen overlay device according to claim 9, wherein said pointing device is a computer mouse.

* * * * *